United States Patent

[11] 3,578,361

| [72] | Inventor | John E. Corrigan |
| | | Evanston, Ill. |
| [21] | Appl. No. | 823,914 |
| [22] | Filed | May 12, 1969 |
| [45] | Patented | May 11, 1971 |
| [73] | Assignee | The Roy M. Moffitt Company |

[54] ROTARY COUPLING AND SEAL COMBINATION
8 Claims, 5 Drawing Figs.

[52] U.S. Cl. ................................................. 285/98,
277/95, 285/276
[51] Int. Cl. ................................................. F16l 17/00
[50] Field of Search ................................................. 285/98,
276, 277, 280, 110; 277/94, 95

[56] References Cited
UNITED STATES PATENTS
| 1,012,398 | 12/1911 | McCombie | 285/98 |
| 1,535,219 | 4/1925 | Fulton | 285/98 |
| 2,013,499 | 9/1935 | Melkenstock | 277/95 |
| 3,180,649 | 4/1965 | Heygate | 285/98X |
| 3,241,866 | 3/1966 | Jackson | 285/98 |
| 3,298,794 | 1/1967 | Mikesell et al. | 285/110X |

*Primary Examiner*—Dave W. Arola
*Attorney*—Hofgren, Wegner, Allen, Stellman & McCord ABSTRACT: A rotary coupling having a seal member between members movable with respect to each other said seal member being composed of a nonporous, slippery, compressibly deformable and abrasive-resistant material and having a flange element extending radially inwardly into deflective engagement with a sealing face of the member rotating with respect to said seal member to define a fluidtight seal between the members of the coupling.

Patented May 11, 1971
3,578,361
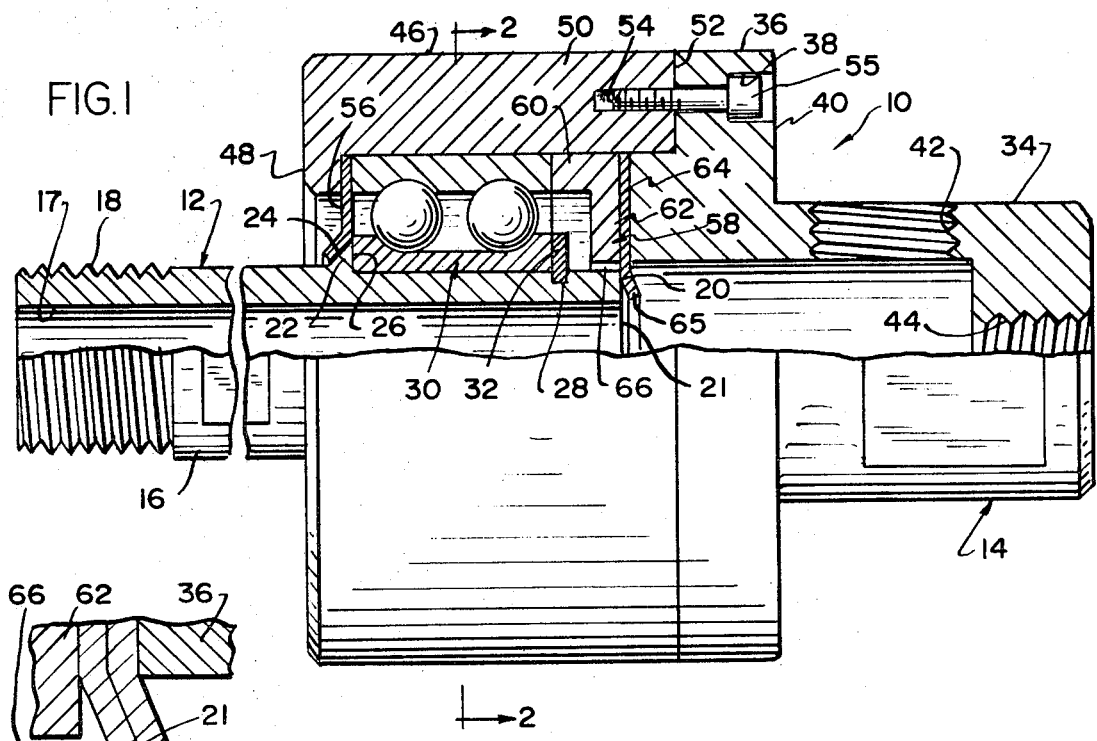
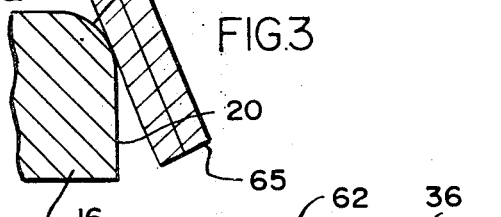
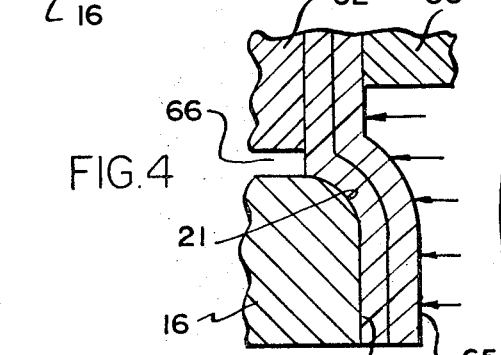
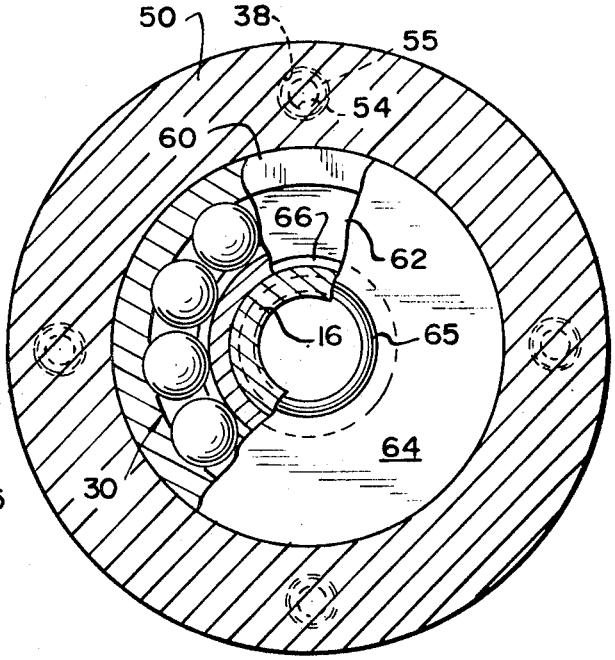
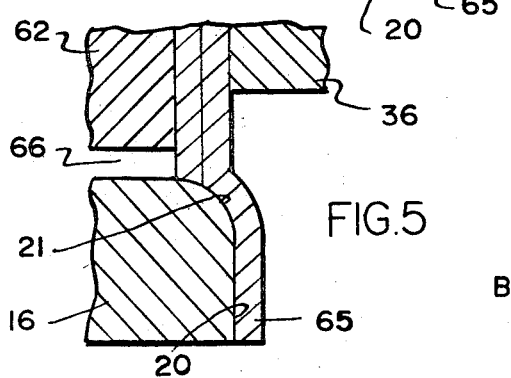
INVENTOR.
JOHN E. CORRIGAN
BY Hofgren, Wegner, Allen, Stellman
McCord.
ATTORNEYS.

3,578,361

ROTARY COUPLING AND SEAL COMBINATION

BACKGROUND OF THE INVENTION

The present invention relates to a rotary coupling adapted to be interposed between members which rotate with respect to each other.

Many types of rotating joints have been developed for use where one member is to rotate with respect to another end where a fluid seal must be defined at said joint. Many such joints use a simple packing assembly which, of course, introduces substantial friction to movement of the members with respect to each other. Additionally, the packing seal generally deteriorates relatively rapidly and requires replacement or repair. Still other types of rotating joints have been developed using mating sealing surfaces which are machined to a very high tolerance so that the interfaces defining the fluid seal are flat with respect to each other. This, of course, requires a high degree of skill and attention during machining operation and involves a substantial sum of money for such work.

I have devised an improved rotary coupling wherein the fluid seal between the rotating members is achieved with means that do not require close attention in manufacture and which are readily replaced if wear occurs.

SUMMARY OF THE INVENTION

It is, accordingly, a primary object of the invention to provide an improved rotary coupling.

Other objects of my invention reside in the provision of an improved rotary coupling wherein a fluid seal is defined between the rotating members with a deflectable sealing member which increases the seal action in direct relation to the amount of pressure present; which is easy to install in the rotary coupling; which is easy to maintain; durable in use; economical to manufacture and use and which provides improved sealing action.

BRIEF DESCRIPTION OF THE DRAWING

FIG. 1 is a side elevation, partly in section, of the rotary coupling of the present invention illustrating in detail the seal member used with the coupling;

FIG. 2 is an end view, taken generally along lines 2-2 of FIG. 1 and showing the bearing assembly of the rotary coupling with parts broken away for clarity;

FIG. 3 is a fragmentary enlarged view of the seal member employed with the rotary coupling shown generally in FIG. 1;

FIG. 4 is a view of the seal member of FIG. 3 showing the deflectable elements moved against the sealing face upon the application of pressure; and FIG. 5 is a view of of the element of FIG. 4 after wear has occurred and showing one of the seal elements of the seal member still in sealing relation with the sealing face of the rotary coupling.

DESCRIPTION

Referring to the drawings and specifically to FIG. 1, the rotary coupling of the present invention is illustrated generally at 10. The rotary coupling is defined generally by a first member 12 and a second member 14. The members 12 and 14, of course, are rotatable with respect to each other.

The first member 12 is defined by a generally longitudinally defined tube 16 externally threaded at one end, as shown at 18, and having a sealing face 20 at the end thereof opposite the threaded section 18. A rounded shoulder or corner 21 connects the face with the outer surface of tube 16 and forms the location of initial sealing. The face 20 is shown at an end of tube 16, but could be a shoulder intermediate the ends thereof. A generally upstanding radial projection 22 is defined along the tube 16 and is provided with a tapered face 24 on one side thereof and a substantially vertical wall 26 on the other side thereof. An annular groove 28 extends around the outer perimeter of tube 16 in spaced relation to the vertical wall 26 of the projection 22. The inner race of a bearing member 40 is telescopically received over the tube 16 and moved against he vertical wall 26 of the projection 22. The other end of the inner race of the bearing 30 terminates at the groove 28 and a retaining ring 32 removably disposed within the recess 28 holds the bearing 30 in assembled relation.

The second member 14 is defined by a generally longitudinally extending tubular section 34 terminating in a radially extending flange 36. The flange 36 is provided with a series of circularly spaced openings 38 extending at spaced intervals about the face 40 of the flange 36. Threaded openings 42 and 44 are provided in the tubular section 34 to permit fluid transfer from the opening 17 of the first member 12, through the coupling and along the second member 14 to the openings 42 or 44. A suitable external connection may be made to either of the openings 42 or 44 with the unconnected opening being sealed by a plug (not shown).

A mating clamp member 46 is provided in the assembly and is adapted to hold the first and second members 12 and 14, respectively, in assembled relation. The flange 46 is generally L-shaped in cross section having a short inwardly extending leg 48 and a tubular extension 50 which terminates in an end face 52. The end face 52 is adapted to be moved into close relation with the flange 36 of the second member 14. A series of openings 54 extend into the clamp 46 from the end face 52. The openings 54 are spaced to be in axially aligned relation with the mating openings 38 of the flange 36. Suitable connecting members, such as machine screws 55, are inserted into the openings 38 of the flange 36 and threadably received in the openings 54 of the clamp 46 to physically join the first and second members 12 and 14.

The leg 48 of the clamp 46 is drawn up against a deflectable seal element 56 which defines a dirt seal between the clamp 46 and the bearing 30 and between the seal 56 and the first member 12. The deflectable seal element 56 is physically captured between the leg 48 and the outer race of the bearing member 30 to prevent entry of dust or other contaminant to the area in which the bearing 30 is placed. A similar protective action is defined by the radially inwardly extending face of the deflectable seal member 56 as it deflectably rests against the tapered face 24 of the projection 22. The seal 56 moves outwardly to mate with the tapered face 24 which places a stress upon the seal 56 and causes it to remain closely against the face 24.

A bearing and seal retention means 58 is mounted within the recess defined by the clamp 46 and the tube 16 of the first member 12, as shown in FIG. 1. The means 58 comprises an annular ring which is generally L-shaped in cross section, with one leg 60 thereof in abutting relation to the outer race of the bearing 30 and the other inwardly extending leg 62 engaging against a deflectable seal member 64 of the assembly.

The seal member 64 is formed as an annulus and has its radially outer part physically captured between the leg 62 and the inner face of the flange 36 of the assembly. This portion of the seal member is compressed and forms a sealing gasket. An inner part 65 of the seal member extends radially inwardly of the assembly to the sealing face 20 of the shaft 16. The inner part 65 of the deflectable seal member 64 engages the curved corner or shoulder 21 and is forced to move away from the general plane of the seal member 64. This action establishes an internal stress in the seal member 64 and the seal member wants to move back to its planar condition. This stress action maintains the inner part 65 in close fluid sealing relation with the corner 21 on the tube 16. Fluid pressure in the coupling will cause the inner seal part 65 to move against the sealing face 20 of the assembly.

The seal member in assembled, nonpressurized condition, takes the shape shown in FIG. 3, with the inner seal part 65 deflected slightly by the rounded corner 21 on the first member 12 to effect a seal. The application of pressure in the coupling will cause forces acting from right to left, as seen in FIGS. 3 and 4, to move the seal member inner part 65 into intimate contact with the leg 62 and sealing face 20 of the assembly. The opening 66 defined between the inner face of the leg 62 and the outer periphery of the tube 16 should be sufficiently small so that the seal member will not extrude therethrough.

The seal member 64 can be formed as a single annular element or can be a composite of two or more elements, with two being shown in FIGS. 3, 4 and 5. The seal member is formed of a material having a number of properties to operate effectively in sealing the rotary coupling. The seal member must operate as a gasket where it is compressively engaged between the flange 36 and the leg 62 and must seal against the relatively rotating tube 16. The seal member is made of a nonporous, slippery, and abrasive-resistant material. The material must also have a relatively high tensile strength and be capable of low pressure deformation without being subject to cold flow. It also has compressibility to provide the gasket effect. Examples of suitable materials are polyethylene terephthalate, sold under the trademark MYLAR and polytetrafluoroethylene, sold under the trademark Teflon. The latter material has a low coefficient of friction and is particularly suitable for use when the horse power required for rotating the relatively movable parts is to be minimized. The first of these materials has a higher tensile strength and abrasion resistance. The seal member can be made from elements of both materials.

Although not limiting the disclosure thereto, the seal member 64, as an example, can have a total thickness of 0.030 inch and the preferred form would have this total thickness made up of five or six nonconnected layers or plies of material, which provides the seal member with more flexibility to follow the contour of the face 20 and curved shoulder 21 of the tube 16 and still provides a maximum thickness of material for wear. This property is shown, particularly, in FIG. 5 wherein one element of the seal member has worn away and the second element has moved into intimate sealing contact with the face 20 and shoulder 21 of the tube 16.

The number of elements is selected to provide a total thickness as required to handle the pressure velocity of fluid in the coupling and to provide the desired life of the seal member.

The seal units of the assembly disclosed herein are readily changed when necessary. For example, one need only remove the retaining members 55 from the openings 38 and 54 of the assembly and separate the first and second members 12 and 14, respectively. The seal member 64 is exposed and it may readily be removed from the assembly and a new member put in place. The first and second members 12 and 14 then are rejoined by securing them in the manner noted above.

I claim:

1. A rotary coupling and seal combination comprising: a disclike seal formed of a nonporous, slippery and abrasive resistant material having a relatively high tensile strength and capable of low pressure deformation without cold flow; first and second tubular members arranged in telescoping relation and having an annular gap separating the same to permit rotation of one relative to the other, one of said members including a generally radially disposed face and a curved surface interposed between the face and at least a portion of the peripheral surface of said one member adjacent the other member, said other member including means for gripping and holding said seal slightly displaced from the plane of said face with a portion of said seal sealingly engaging said curved surface and being deflected thereby so that said seal spans said annular gap and is free from engagement with said peripheral surface of said one member; and means for holding said first and second tubular members in assembled relation.

2. The invention of claim 1 wherein said radially disposed face is planar.

3. In the combination of claim 1, said seal being formed of a series of thin annular elements having a total thickness equal to the desired thickness of the seal.

4. In the combination of claim 3 wherein said seal elements are of polyethylene terephthalate.

5. In the combination of claim 3 wherein said seal elements are of polytetrafluoroethylene.

6. A rotary coupling and seal combination comprising a pair of tubular members rotatable one with respect to the other, structure for connecting said members together including a pair of spaced-apart elements fixed with respect to each other, one of said members having a planar sealing face and a curved shoulder between said face and the outer perimeter of said one member, and an annular seal member having an outer part held between and by said spaced-apart elements, the seal member being provided with an inner part engaging a portion of said curved shoulder and deflected thereby whereby fluid in said coupling is sealed by the gasket and the engagement with said curved shoulder, the inner part of said seal member being urged flat against said planar sealing face and around at least a portion of said curved shoulder by the pressure of said fluid, said seal member being of compressible and deformable material.

7. A combination as defined in claim 6 wherein said seal member is composed of a plurality of plies of material of a material such as polyethylene terephthalate.

8. An improved rotary coupling joint for two conduits to permit movement of said conduits relative to each other comprising: first and second conduit members in assembled relation defining a continuous central opening, the first conduit member having a generally cylindrical outer surface terminating at one end in a planar end face with an arcuate corner extending between said end face and said cylindrical outer surface; generally flat sealing means capable of deformation under low pressure without cold flow mounted in the first and second conduit members assembly and terminating inwardly at the end face of the first conduit member to define a central opening and being mounted slightly displaced from the plane of said end face so that the inner terminal end thereof is slightly deflected against the arcuate corner of the first conduit member to define a stressed condition in the sealing means thereby defining an initial sealing condition in the sealing means to prevent the passage of fluid between the end face and the sealing means; and means to hold the first and second conduit members in assembled relation.